(12) United States Patent
Li (10) Patent No.: US 7,691,159 B2
(45) Date of Patent: Apr. 6, 2010

(54) METHOD OF CONVERTING TRIGLYCERIDES TO BIOFUELS

(75) Inventor: Lixiong Li, Panama City, FL (US)

(73) Assignee: Applied Research Associates, Inc., Albuquerque, NM (US)

( * ) Notice: Subject to any disclaimer, the term of this patent is extended or adjusted under 35 U.S.C. 154(b) by 230 days.

(21) Appl. No.: 11/857,937

(22) Filed: Sep. 19, 2007

(65) Prior Publication Data

US 2008/0071125 A1    Mar. 20, 2008

Related U.S. Application Data

(60) Provisional application No. 60/826,164, filed on Sep. 19, 2006, provisional application No. 60/826,167, filed on Sep. 19, 2006.

(51) Int. Cl.
*C07C 2/50* (2006.01)

(52) U.S. Cl. .................... 44/605; 554/126; 554/160; 44/306; 44/307; 44/308; 44/385; 585/361

(58) Field of Classification Search ......... 530/232–233; 528/373–374; 554/126, 124, 160; 585/600–601; 44/306–308, 385, 605
See application file for complete search history.

(56) References Cited

U.S. PATENT DOCUMENTS 1,374,589 A    4/1921    Levey (Continued)

FOREIGN PATENT DOCUMENTS

EP    0249463 A2    9/2007

| | | |
|---|---|---|
| WO | 03004588 A2 | 1/2003 |
| WO | 03014272 A2 | 2/2003 |

(Continued)

OTHER PUBLICATIONS

Alencar et al., "Pyrolysis of Tropical Vegetable Oils," Journal of Agriculture Food Chemicals, 31(6), 1268-70, (1983).

(Continued)

*Primary Examiner*—Robert J Hill, Jr.
*Assistant Examiner*—Brian McCaig
(74) *Attorney, Agent, or Firm*—Dinsmore & Shohl LLP; Monika J. Hussell (57) ABSTRACT

A triglyceride-to-fuel conversion process including the steps of (a) preconditioning unsaturated triglycerides by catalytic conjugation, cyclization, and cross-link steps; (b) contacting the modified triglycerides with hot-compressed water containing a catalyst, wherein cracking, hydrolysis, decarboxylation, dehydration, aromatization, or isomerization, or any combination thereof, of the modified triglycerides produce a crude hydrocarbon oil and an aqueous phase containing glycerol and lower molecular weight molecules, and (c) refining the crude hydrocarbon oil to produce various grades of biofuels. A triglyceride-to-fuel conversion process further including the steps of (a) carrying out anaerobic fermentation and decarboxylation/dehydration, wherein the anaerobic fermentation produces hydrogen, volatile acids, and alcohols from fermentable feedstocks, and the decarboxylation/dehydration produces alkenes from the volatile acids and alcohols, respectively; (b) feeding the alkenes to the cyclization process; (c) feeding the hydrogen to the post refining process; and (d) recycling the aqueous phase containing glycerol to the decarboxylation/dehydration process. A biofuel composition including straight-chain, branched and cyclo paraffins, and aromatics. The paraffins are derived from conversion of triglycerides. The aromatics are derived from conversion of either triglycerides, petroleum, or coal.

27 Claims, 2 Drawing Sheets

U.S. PATENT DOCUMENTS

| | | | |
|---|---|---|---|
| 2,242,230 | A | 5/1941 | Burr |
| 2,350,583 | A | 5/1944 | Bradley |
| 3,984,444 | A * | 10/1976 | Ritz et al. .................... 554/34 |
| 4,102,938 | A | 7/1978 | Rao |
| 4,196,134 | A | 4/1980 | Ball |
| 4,279,722 | A | 7/1981 | Kirkbride |
| 4,364,745 | A | 12/1982 | Weil |
| 4,526,675 | A | 7/1985 | Mahoney et al. |
| 4,992,605 | A | 2/1991 | Craig |
| 5,233,109 | A | 8/1993 | Chow |
| 5,565,616 | A | 10/1996 | Li |
| 5,578,090 | A | 11/1996 | Bradin |
| 5,578,647 | A | 11/1996 | Li |
| 5,705,722 | A | 1/1998 | Monnier et al. |
| 5,917,068 | A | 6/1999 | Barnicki et al. |
| 5,972,057 | A | 10/1999 | Hayafuji et al. |
| 6,187,903 | B1 | 2/2001 | Elasser |
| 6,420,322 | B1 * | 7/2002 | Kodali ........................ 508/452 |
| 6,585,890 | B2 | 7/2003 | Li |
| 6,897,327 | B2 | 5/2005 | Rongione |
| 7,045,100 | B2 | 5/2006 | Ergun et al. |
| 7,455,704 | B2 | 11/2008 | Garwood |
| 2003/0167681 | A1 | 9/2003 | Delgado Puche |
| 2004/0074760 | A1 | 4/2004 | Portnoff et al. |
| 2004/0225141 | A1 | 11/2004 | Rongione |
| 2004/0225143 | A1 | 11/2004 | Rongione |
| 2004/0231236 | A1 | 11/2004 | May et al. |
| 2005/0232956 | A1 | 10/2005 | Bist et al. |
| 2006/0186020 | A1 | 8/2006 | Gomes |
| 2007/0039240 | A1 | 2/2007 | Carroway |
| 2007/0068848 | A1 | 3/2007 | Monnier et al. |
| 2007/0144060 | A1 | 6/2007 | Ikura |
| 2008/0034645 | A1 | 2/2008 | Bressler |
| 2008/0092436 | A1 | 4/2008 | Seames et al. |
| 2008/0229654 | A1 | 9/2008 | Bradin |

FOREIGN PATENT DOCUMENTS

| | | |
|---|---|---|
| WO | 2004035714 A1 | 4/2004 |
| WO | 2007068798 A2 | 6/2007 |

OTHER PUBLICATIONS

Chen et al., "Synthesis and photopolymerization of norbornyl epoxidized linseed oil," Polymer, 43, 5379-89, (2002).

Cheng, Fa-Wu, "China Produces Fuels from Vegetable Oils," Chemical & Metallurgical Engineering, 99 (1945).

Dai et al., "Catalytic dehydration of propylene glycol with salts in near-critical water," Applied Catalysis A: General, 258, 189-193, (2004).

Demirbas, Ayhan and Huseyin Kara, "New Options for Conversion of Vegetable Oils to Alternative Fuels," Energy Sources, Part A, 28, 619-626, (2006).

Dobson, Gary and Jean Louis Sebedio, "Monocyclic dienoic fatty acids formed from y-linolenic acid in heated evening primrose oil," Chemistry and Physics of Lipids, 97, 105-118 (1999).

Fujii, T., P. Khuwijitijaru, Y. Kimura, S. Adachi, "Decomposition Kinetics of Monoacyl glycerol and fatty acid in subcritical water under temperature-programmed heating conditions," Food Chemistry 94, 341-347 (2006).

Holliday et al., "Hydrolysis of Vegetable Oils in Sub-and Supercritical Water," Ind. Eng. Chem. Res., 36, 932-935, (1997).

Idem et al., "Thermal Cracking of Canola Oil: Reaction Products in the Presence and Absence of Steam," Energy & Fuels, 10, 1150-62, (1996).

Kapdan, I.K. and F. Kargi "Bio-Hydrogen Production from Waste Materials," Enzyme and Microbial Technology, 38, 569-582 (2006).

King et al., "Hydrolysis of soybean oil in a subcritical water flow reactor," Green Chemistry, 261-264, (1999).

Kubickova, I., M. Snare, K. Eranen, P. Maki-Arvela, D. Y. Murzin "Hydrocarbons for Diesel Fuel via Decarboxylation of Vegetable Oils," Catalysis Today, 106, 197-200 (2005).

Ma, Fangrui and Milford A. Hanna, "Biodiesel production: a review," Bioresource Technology, 70, 1-15 (1999).

Matikainen et al., "1,5-hydrogen shift and other isomerization reactions of certain ethyl octadecatrienoates," Tetrahedron, 53, 4531-4538 (1997).

Radlove et al., "Catalytic Isomerization of Vegetable Oils," Industrial and Engineering Chemistry, 38(10), 997-1002, (1946).

Schwab et al., "Diesel Fuel from Thermal Decomposition of Soybean Oil," JAOCS, 65(11), 1781-86, (1988).

Sebedio, J.L. and A. Grandgirard, "Cyclic Fatty Acids: Natural Sources, Formation During Heat Treatment, Synthesis and Biological Properties," Prog. Lipid Res. 28, 303-336, (1989).

Wang, Chaohua and Sevim Erhan, "Studies of Thermal Polymerization of Vegetable Oils with a Differential Scanning Calorimeter," JAOCS, 76(10), 1211-16, (1999).

Watanabe et al., "Decomposition of a long chain saturated fatty acid with some additives in hot compressed water," Energy Conversion and Management, 47, 3344-50, (2006).

International Search Report and Written Opinion pertaining to International Application No. PCT/US2007/78935 dated Jun. 3, 2008.

International Preliminary Report on Patentability pertaining to International Application No. PCT/US2007/78935 dated Dec. 11, 2008.

* cited by examiner

Figure 1

PRIOR ART

Figure 2

PRIOR ART

METHOD OF CONVERTING TRIGLYCERIDES TO BIOFUELS

CROSS-REFERENCE TO RELATED APPLICATIONS:

This Application claims the priority under 35. U.S.C. §119(e) to U.S. Provisional Application Ser. Nos 60/826,164 and 60/826,167, each filed Sep. 19, 2006, entitled "Method of Converting Triglycerides to Biofuels" and "Biofuel Compositions Derived from Triglycerides," respectively, both of which are incorporated herein by reference.

BACKGROUND OF THE INVENTION

1. Field of the Invention

This invention relates to a method of converting triglycerides to biofuels. The triglycerides are derived from renewable sources, including vegetable oils. The biofuels include the grades of gasoline, jet fuel, diesel, and heavy oil.

2. Discussion of Related Art

Vegetable oils are triglycerides with the generic formula shown below for soybean oil (with triglycerides and unsaturated fatty acids shown):

Oleic Acid (9,cis)

Linoleic Acid (9,12,cis,cis)

Linoleic Acid (9,12,15,cis,cis,cis)

where $R_1$, $R_2$, and $R_3$ are the same or different hydrocarbon residues of fatty acids. Variations in crop oils contribute to different types and proportions of fatty acids in the triglycerides.

Crop oils that contain more than 30% polyunsaturated fatty acids (a preferred feedstock for the process of the present invention) include corn oil, cottonseed oil, linseed oil, peanut oil, safflower oil, soybean oil, sunflower oil and tung oil. The table below sets forth the various types of poly-unsaturated fatty acids present in these crop oils.

Composition of Selected Crop Oils

| Crop Oil Polyunsat. Fat Type | 14:0 | 16:0 Palmitic | 16:1 | 18:0 Stearic | 18:1 Oleic | 18:2 Linoleic | 18:3 Linolenic | 20:0 | 22:0 |
|---|---|---|---|---|---|---|---|---|---|
| Corn oil |  | 12.2 | 0.1 | 2.2 | 27.5 | 57.0 | 0.9 | 0.1 |  |
| Linseed oil |  | 7.0 |  | 4.0 | 39.0 | 15.0 | 35.0 |  |  |
| Peanut oil | 0.1 | 11.6 | 0.2 | 3.1 | 46.5 | 31.4 |  | 1.5 | 3.0 |
| Soybean oil | 0.1 | 11.0 |  | 4.0 | 23.4 | 53.2 | 7.8 | 0.3 | 0.1 |
| Sunflower oil | 0.2 | 6.8 | 0.1 | 4.7 | 18.6 | 68.2 | 0.5 | 0.4 |  |
| Tung oil |  | 3.1 |  | 2.1 | 11.2 | 14.6 | 69.0* |  |  |

*cis-9, trans-11, trans-13-octadecatrienoic acid

Soybean oil is 61% polyunsaturated. Over 80% of vegetable oil production in the United States is soybean oil. For these reasons, soybean oil may be the most preferred material for biofuel production using the process of the present invention. The soybean compositions include hulls (8wt %), oil (20wt %), protein (43wt %), ash (5 wt %), and water (balance).

Figure 1:
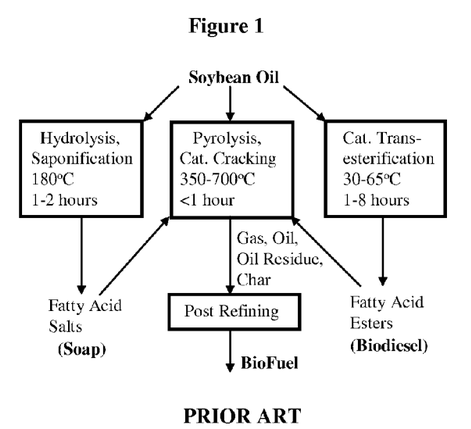
FIG. 1 shows three prior art methods of converting soybean oil to biofuel, using atmospheric pressure.

The concept of converting vegetable oils into engine fuels was first attempted more than 100 years ago. During the late 1930s through 1940s, due to the shortage of petroleum, industrial-scale plants became operational to produce gasoline, kerosene, and other grades of fuel from vegetable oils. By the nature of the molecular structures of vegetable oils, heat is required for any fuel conversion processes. According to a recent review, various processes for converting crop oils into biofuels can be summarized into three categories as shown in FIG. 1. Among these conventional processes that are typically carried out at near atmospheric pressures, direct pyrolysis or catalytic cracking is the most common approach. Converting soybean oil into fatty acid salt (soap) followed by catalytic cracking is also reported. Recently, biodiesel production from transesterification of soybean oil has become popular. Biodiesel can also be further processed using conventional upgrading and post refining processes that typically include one or more of the following unit operations: catalytic cracking, isomerization, aromatization, and hydrogenation. However, each of these processes require high temperatures, which in addition to being costly, also causes oil degradation, resulting in loss of valuable oil to gaseous byproducts and less valuable coke.

Figure 2:
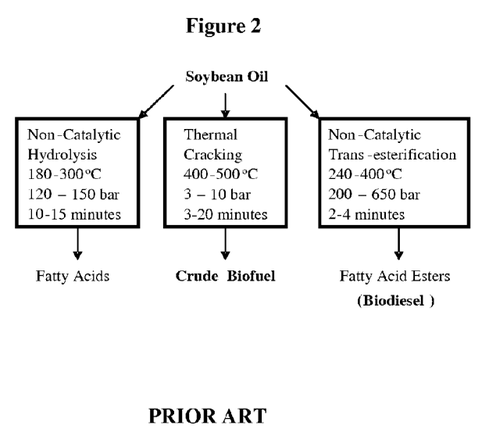
FIG. 2 shows three prior art methods for converting soybean oil into fatty acids and biofuel using moderate and high pressure processes.

High-pressure processes for both hydrolysis and transesterification of soybean oil have been recently demonstrated as shown in FIG. 2. These processes proceed more rapidly than the low-pressure processes and do not require catalysts. Pressure also appears to enhance direct pyrolysis and/or catalytic cracking of vegetable oils. It has been reported that a yield of 75% "crude oil" can be obtained by cracking tung oil at pressures ranging from 3-10 bar (50-150 psig) and at temperatures from 400-500° C. Based on boiling point, the resulting "crude oil" consisted of 50% gasoline, 30% kerosene, and 20% fuel oils. Therefore, high-pressure processes hold the potential for successfully converting crop oils into biofuel surrogate with relatively short reaction time, yet high mass and energy conversion efficiencies.

SUMMARY OF THE INVENTION

Figure 3:
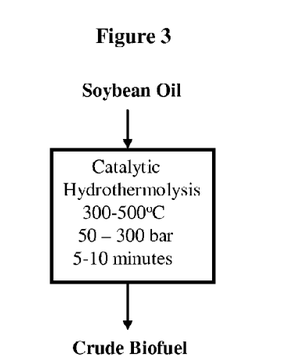
FIG. 3 is a simple diagram showing the catalytic hydrothermolysis process of the present invention.

The central step of the process of the present invention is based on high pressure and moderate temperature operating ranges (15 to 250 bar and 240° C. to 450° C., respectively) and the presence of water and catalysts as shown in FIG. 3. The combination of these operating conditions provides a feasible hydrothermolysis process that results in minimal degradation of the crop oils into less valuable gaseous byproducts and coke.

The present invention has three unique and distinctive features reflected in the processing sequence and conditions that are likely to produce the desired products and energy and mass conversion efficiencies. First, the approach employs the best process options among the proven technologies for converting vegetable oils to biofuels and integrates them with the innovative concept of Catalytic Hydrothermolysis (CH). Specifically, significant gains are expected with respect to obtaining more desirable hydrocarbon structures for the utility of producing aviation fuels and other biofuel surrogates, due to the uniqueness and innovation of the present invention in the following aspects: (1) the presence of water that serves as a reactant, catalyst, and solvent for typically acid- or base-catalyzed reactions; (2) hydrogen supply by water for hydrocarbon cracking as well as hydrolysis of triglycerides followed by decarboxylation; (3) high-pressure process that reduces the formation of gaseous products; and (4) water that functions as an effective heat transfer medium.

Compared to the conventional catalytic cracking and pyrolysis typically operated at 400° C. to 700° C. shown in FIG. 1, temperature for the CH process in the present invention is significantly lower (240° C. to 450° C.) shown in FIG. 3. The lower operating temperature and the presence of water minimize degradation of the oil into less valuable gaseous byproducts and coke, respectively.

The present invention includes a combination of pre-conditioning steps as hereinafter set forth creates a modified soybean oil before cracking, as compared to direct cracking of vegetable oil in other conventional approaches. An advantage of the present invention includes modification of the triglycerides before catalytic hydrothermolysis to greatly improve the chemical, physical and combustion quality of certain biofuels produced by this process, such as aviation fuels. This is accomplished by producing the appropriate molecular weight of cycloalkanes that have high hydrogen content, high density, high volumetric energy content, high thermal stability, and good low temperature properties (freezing point and viscosity) compared to petroleum-derived, coal-derived or triglyceride-derived jet fuel from other processes.

It is an objective of the present invention to incorporate anaerobic fermentation of the post-conversion product to further provide a material/energy-saving process. This converts crop oil processing wastes and/or crop waste associated with the oil harvesting, into hydrogen and alkenes needed for oil conversion.

Being operated at around 37° C., the anaerobic fermentation requires only low-grade thermal energy that can be recovered from other thermal processes.

DETAILED DESCRIPTION

The present invention is a process for converting triglycerides to crude biofuel in hot, compressed water by catalytic hydrothermolysis (CH); in some embodiments this process includes a catalyst in the water or in the oil phase. CH reactions may include cracking, hydrolysis, decarboxylation, dehydration, isomerization, cyclization, recombination and/or aromatization.

Figure 4:
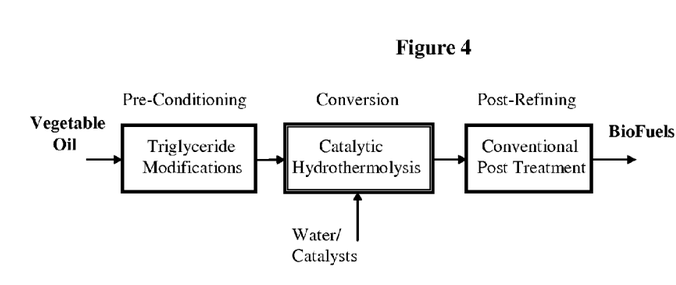
FIG. 4 is a block diagram showing the general steps of the present invention.
Figure 5:
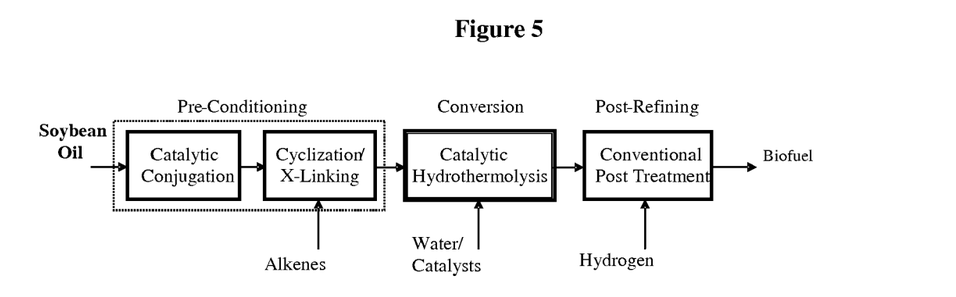
FIG. 5 is a block diagram showing the conversion of soybean oil to JP-8 circuit with the more specific steps of the present invention.

Additionally, certain embodiments of the process of the present invention (as shown in FIGS. 4 and 5) include pre-conditioning vegetable oil (naturally including the triglycerides) into an oily polymeric matrix with an optimal degree of cyclization and cross-linking on the fatty acid carbon backbones, before contacting the same with high-temperature water. Specific triglyceride pre-conditioning processes may include catalytic conjugation, cyclization, and cross-linking reactions. There are sufficient prior art literature base and technical knowledge to carry out each of these reactions. However, pre-conditioning triglycerides prior to the conversion by CH is one of the novel and non-obvious elements of the present invention. The resulting hydrocarbon mixture from the CH process may be further refined by conventional hydrogenation and fractionation operations to produce a tailored biofuel surrogate that meets specifications for petroleum derived fuels. Details of these processing steps are given in the following table, and in the following sections of this specification.

| Processing Step | Typical Conditions | Reactions | Purpose/Benefits |
|---|---|---|---|
| 1. Catalytic Conjugation | 150-180° C. atmospheric 4-8 hours Ni/C catalysts | Isomerization of polyunsaturated fatty acids to shift double bonds into conjugated form | Preparation for cyclization via Diels-Alder reaction |
| 2. Cyclization/Cross-Linking | 170-300° C. 5-50 bar <1 hours | A. Diels-Alder addition of alkenes to the conjugated fatty acids B. Cross-linking among different fatty acids at various double bonds | Formation of cycloalkenes, and 3-D molecular matrix with low degrees of cross-linking |
| 3. Catalytic Hydro-Thermolysis | 240-450° C. 15-250 bar 1-40 min Water/oil = 1:5 to 5:1 catalysts | A. Cracking and hydrolysis of the modified oil mixture with the help of water and catalysts B. Catalytic decarboxylation/dehydration (see Steps 4 and 5 below) | Formation of a spectrum of straight, branched, cyclic and aromatic molecules, with a minimum gaseous fraction |
| 4a. Catalytic Decarboxylation/Dehydration | 330-450° C. 15-250 bar 5-40 min catalysts | Elimination of carboxylic groups of fatty acids, and removal of hydroxyl groups from the carbon backbone | Deoxygenation to increase fuel energy content |
| 4b. $C_3$, $C_4$ Decarboxylation $C_2$, $C_3$, $C_4$ Dehydration | 330-500° C. 15-300 bar 5-40 min catalysts | Elimination of carboxylic groups of the volatile acids, and removal of hydroxyl groups of the alcohols | Supply of alkenes for the cyclization step |
| 5. Soybean Waste Anaerobic Fermentation | 37° C. atmospheric 6-12 hours pH 5 to 5.5 | Microbial hydrogen production | Supply of $H_2$ for the hydrogenation, and byproducts for alkene production |
| 6. Post Refining | <400° C. <1000 psig | Convert straight-chain, branched, and cyclo olefins into corresponding alkanes | Necessary to achieve thermal stability required for jet fuel |

1. Pre-Conditioning

Catalytic Conjugation is step 1 of the processing outlined in the table above. From the success in fuel conversion of tung oil during the 1930s and 1940s, it was recognized that the yield and quality of biofuels depend critically on process conditions as well as the chemical structure of the feedstock. Tung oil is one of the few crop oils that contain extremely high polyunsaturated fatty acids (83 wt %, C18:2 and C18:3) which are predominately in the conjugated form (69 wt %, C18:3). Commonly available vegetable oils, on the other hand, contain lesser amounts of polyunsaturated fatty acids and these acids are in unconjugated forms, that is the double bonds are not located at adjacent carbon atoms. Therefore, various attempts were made in the early period to develop economical processes for the isomerization of domestically available oils to conjugated forms that can be further processed for fuel production. For purposes of this specification, the term "conjugated triglycerides" shall mean the triglycerides with their polyunsaturated fatty acid backbones structurally altered by conjugation processes.

As early as 1946, highly effective catalytic conjugation processes have been used to yield up to 34% conjugation, under mild reaction conditions using commercially available Ni/C catalysts. The isomerization of linoleic acid (52 wt % in soybean oil) into 10,12 trans,trans conjugated form, illustrated below for soybean oil, is one of eight isomers (two positional times four geometrical). The positional isomers refer to 9,11 and 10,12, and the geometrical refer to trans, trans-, trans,cis-, cis,trans-, and cis,cis-.

10,12-cis,cis Conjugation 10,12-trans,trans Conjugation

Cyclization and Cross-Linking is step 2 shown in the table above. Cyclization may follow either inter-molecular or intra-molecular pathways. The former involves the Diels-Alder reaction of the (cis) conjugated polyunsaturated fatty acid backbone with an olefin, such as ethylene, propylene, acrolein, 1-hydroxyl-proylene, and butene, as illustrated first below, or with a mono-unsaturated fatty acid (oleic acid) as shown in the second diagram below.

Suitable alkenes or olefins include hydrocarbons comprising at least one double bond having a molecular formula of $H_2C{=}CHX$, where X is a hydrocarbon or hydrogen.

Alternatively, linolenic acid (7 wt %) may proceed through intra-molecular cyclization. Four isomers of monocyclic dienoic fatty acids, as shown below, derive from heating linolenic acid.

Parallel to the cyclization reactions, cross-linking at the unconjugated double bond positions of the fatty acid carbon backbones may occur according to the mechanism employed in Friedel-Crafts cross-linking methods. Cross-linking, also known as polymerization, of vegetable oils is a fairly common practice that can be encountered either as unwanted reactions, such as in deep frying, or as desired structural modifications, such as heat treatment to improve cold flow characteristics for production of a surfactant, detergent, printing ink, and paint components from vegetable oils. For soybean oil, cross-linking begins when heated above 200° C. without catalysts. As is known in the art, the degree and reaction rate of cross-linking can be controlled by temperature, time, and/or the addition of catalysts, such as Cu and $ZnCl_2$. The intermolecular or intramolecular cross-linking process may occur simultaneously with the cyclzation process in pre-conditioning triglycerides described in the current invention. As described above, both cyclization and cross-linking are well known processes. However, the combination of catalytic conjugation followed by cyclization and cross-linking is a novel and non-obvious element of the present invention.

For purposes of this specification, the term "modified triglycerides" shall mean the triglycerides with their fatty acid backbones structurally altered by one or more pretreatment processes including conjugation, cyclization, and cross-linking steps described above. These triglyceride preconditioning processes of catalytic conjugation and cyclization and cross-linking, while used with vegetable oils, are novel to the conversion of triglycerides for purposes of creating crude biofuels.

2. Catalytic Hydrothermolysis (CH).

Catalytic Hydrothermolysis is step three according to the table above. There is a growing interest in hot-compressed water as alternatives to organic solvents and as a medium for unique and/or green chemistry. Of particular interest is processes in water near its critical point ($T_c$=374° C., $P_c$=221 bar, and $\rho_c$=0.314 g/ml). One of the attractive features of hot-compressed water is the adjustability of its properties by varying process temperature and pressure. Specific to its solvent properties, the dielectric constant of water can be adjusted from 80 at room temperature to 5 at its critical point. Therefore, water can solubilize most nonpolar organic compounds including most hydrocarbons and aromatics starting at 200-250° C. and extending to the critical point. The reversal of the solvent characteristics of hot-compressed water also results in precipitation of salts that are normally soluble in room temperature water. Most inorganic salts become sparingly soluble in supercritical water. This is the basis for unique separation of ionic species in supercritical water. The precipitated salts can serve as heterogeneous catalysts for reactions in supercritical water.

Hot-compressed water has been exploited in a number of novel processes including oxidation, partial oxidation, hydrolysis, and cracking/thermal degradation of small molecular compounds and polymeric materials. The last processing area of this list is the most pertinent to the process of the present invention. Studies have already been conducted on the thermal degradation of polyethylene in subcritical and supercritical water since the late 1990s. It has also been shown that supercritical water suppressed coke formation and increased oil yield in cracking polyethylene as compared to thermal cracking. As a comparison, conventional cracking inevitably produces large fractions of coke and light hydrocarbons. For example, catalytic cracking of palm oil without water can achieve 99 wt % conversion, but only 48 wt % gasoline yield at 450° C. using zeolite catalysts with the balance (52%) being coke and light hydrocarbons. The unique and established contributions by hot-compressed water to various oxidation and hydrolysis processes are translated to modified soybean oil in the CH process of the present invention.

The CH process as used in the present invention can trigger the following simultaneous or sequential reactions: cracking, hydrolysis, decarboxylation, dehydration, isomerization, recombination, and/or aromatization.

Cracking is the key reaction pathway to manipulate the carbon chain length distribution and structural variation of the resulting hydrocarbon mixture. In such a water/oil homogeneous state and uniform and rapid heating environment provided by hot-compressed water, the cracking reactions of the current invention produce a more desirable spectrum of hydrocarbon products than any conventional thermal cracking process. Unsaturated fatty acids and derivatives are more susceptible for cracking at lower temperatures than the saturated fatty acids. Specifically, cracking of unsaturated fatty acids and pre-conditioned derivatives are likely to occur at the carbon adjacent to either side of a double bond or a junction point of three carbon-carbon bonds resulting from cross-linking. The apparent activation energy for hydrothermal cracking heavy saturated hydrocarbons has a reported value of 76 kJ/mol. Cracking reactions and products are summarized in the following table.

| CH Cracking Reactions and Products. |
|---|
| Oleic acid (23%) → $C_9$ and $C_8$ Alkane/alkene |
| Cyclized linoleic acid (54%) → $C_{11}$ Cycloalkene with branched alkane and $C_8$ alkene |
| Cyclized linoleic/oleic acids → $C_{11}$ Aromatics with branched alkane and $C_8/C_9$ alkane/alkene |
| Cross-linked fatty acids → $C_{11}$ and $C_{10}$ Alkane/alkene and $C_{11}$ cycloalkene with branched alkane |
| Intramolecularly cyclized linolenic acid (7%) → $C_{11}$ Cycloalkene with branched alkane and $C_6$ alkene/alkane |

Hydrolysis of the modified soybean oil proceeds rapidly to produce carboxylates and release glycerol and glycerol-based chemicals. The hydrolysis follows a second-order kinetics with the activation energy of 43.2 kJ/mol. As an important consequence, the hydrolysis process not only releases fatty acids from triglycerides, but also adds a proton to each carboxylate and a hydroxyl ion to glyceride. The added proton will be transferred to the carbon backbone upon further treatment of the carboxylates by either decarboxylation or hydrotreating, resulting a fuel containing hydrocarbons with higher H/C ratios.

Catalytic Decarboxylation/Dehydration is step 4a according to the table above. Decarboxylation removes oxygen as carbon dioxide from fatty acids. Reactions of long chain saturated fatty acids in hot-compressed water primarily produce alkanes and alkenes with one less carbon than that of the starting compound. Specifically, decarboxylation of stearic acid in supercritical water follows monomolecular and bimolecular reaction pathways. The former produces $C_{17}$ alkane, and the latter renders $C_{35}$ ketone (i.e., combining two fatty acid molecules) and $C_{16}$ alkene. The formation of $C_{35}$ ketone may increase $C_{10}$ and $C_{11}$ fractions in the cracked hydrocarbon mixture. The presence of a water solvent field greatly facilitates the decarboxylation reaction. For soybean saturated fatty acids (14 wt %), mostly palmitic acid (11 wt %), decarboxylation is likely to occur before cracking. While decarboxylation removes carbon dioxide from the fatty acid, the proton stays with the carbon backbone to form the alkane. Therefore, for each mole of soybean oil, 1.5 moles of $H_2$ are extracted from water and added to the resulting hydrocarbon.

Processing parameters govern the effectiveness and efficiency of the CH process and its product quality and distribution include temperature, water to oil ratio, catalysts, and rate of heating and depressurization. Specifically, temperature effects the rates of parallel reactions, hence influencing carbon chain length distribution and characteristics. The CH process is conducted at temperatures ranging from 240 to 450° C. under corresponding pressures either above or below the saturation or critical pressure. The deviation of pressure from saturation or critical pressure may be determined by process operability, product quality and economics. In addition, isomerization and aromatization may take place under CH conditions at the higher temperatures, in the range of 400 to 500° C.

The water to oil ratio is another key factor to control the rates of cracking, hydrolysis, and decarboxylation, hence impacting on product distributions. It also has process economic implications, since more water would require more thermal energy input. The water to oil mass ratio is controlled in the range from 10:1 to 1:100, preferably from 1:1 to 1:10.

Most catalysts used in conventional organic phase oil conversion processes are likely to be deactivated by water, particularly high-temperature water. Two types of materials have been used as catalysts in high-temperature water applications: metal oxides and inorganic salts. Catalysts suitable for use in the CH process include salts, oxides, hydroxides, clays, minerals, and acids. Preferably, catalysts are selected from metal oxides, preferably transition metal oxides, such as $ZrO_2$, $TiO_2$. and $Al_2O_3$; high melting point salts which are insoluble in supercritical water, such as $Na_2CO_3$, $Cu_2Cl_2$ and $Cu_2Br_2$; low melting point salts, such as $ZnCl_2$; hydroxides, such as alkali and alkali earth metal hydroxides; clays such as bentonite and montmorillonite; minerals such as silicates, carbonates, molybdates, or borates; or mineral or boric acids.

Finally, the rate of oil heating and depressurization of the CH process effluent can be used to manipulate product yield and quality. Critically, the rate of heating the oil by contact with the water should be rapid, preferably no less than 10° C. per second. Similarly, the pressure of the oil/water mixture should be reduced before releasing the same through a nozzle, or otherwise allowing sudden expansion, to ensure continued separation of the oil and water.

3. Post Refining

Post refining is step 6 according to the table above. Post refining includes hydrogenation and fractionation. The hydrocarbons produced by the CH process may consist of branched and cyclo alkenes, which require relatively mild hydrotreating conditions of pressures up to about 66 bar and temperatures up to about 425° C., by hydrogenation. Fractionation or isomerization of the hydrotreated product may also be required to remove light fractions or uncracked heavy fraction from the biofuel surrogate.

4. Additional Processes

Figure 6:
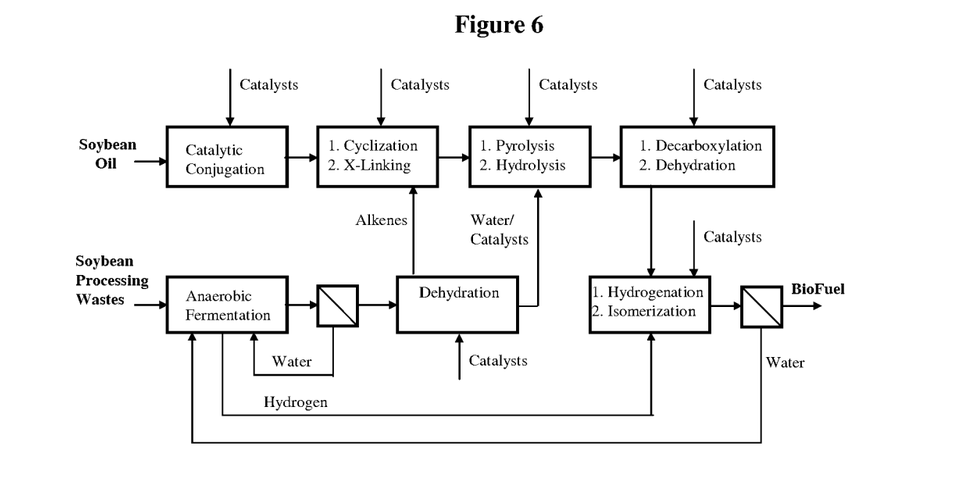
FIG. 6 is a flow chart of an embodiment of the processes of the present invention.
Figure 7:
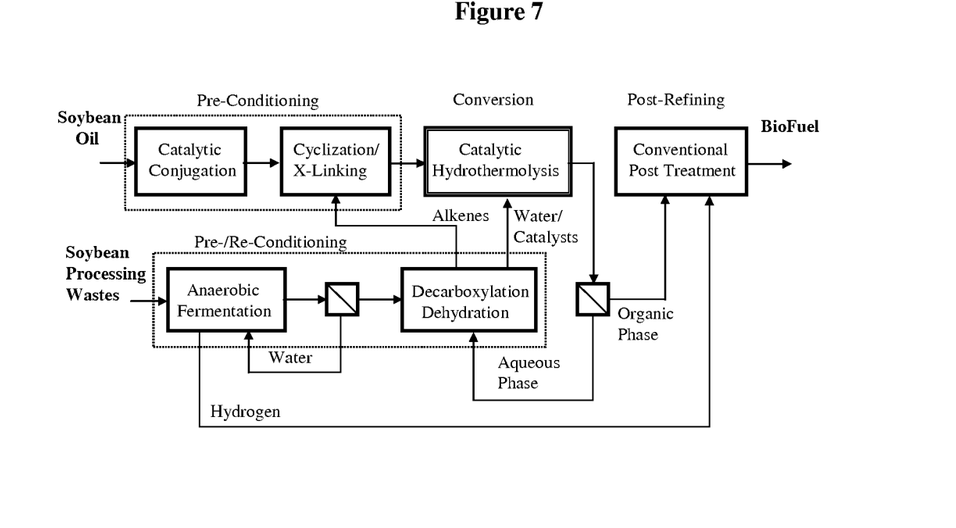
FIG. 7 is a flow chart of another embodiment of the processes of the present invention.

As shown in FIGS. 6 and 7, other supporting processes may be added to the basic process. Specifically, anaerobic fermentation may be used to generate hydrogen, volatile fatty acids and alcohols from soybean processing wastes or fermentable wastes from other sources. Decarboxylation and dehydration convert volatile acids to alkenes (decarboxylation), and alcohols to alkenes (dehydration), respectively. These processes may further improve mass and energy conversion efficiencies of the overall conversion process.

Anaerobic Fermentation is step 5 according to the table above. Anaerobic fermentation is a process employing microbes to convert fermentable nutrients/wastes into hydrogen, alcohols, and volatile acids. The metabolic mechanism of anaerobes allows them to obtain adenosine tri-phosphate (ATP) as the immediate energy source to carry out essential activities such as growth, reproduction, movement, and self-maintenance. The process also produces many byproducts. The gaseous products are hydrogen (55-65%) and carbon dioxide, and the liquid organic products are volatile acids (such as formic acid, acetic acid, lactic acid, butyric acid, oxalic acid, propionic acid, malonic acid, and valeric acid), and alcohols (such as ethanol, propanol and butanol). Neither methane nor CO is produced. A number of naturally spore-forming microbes, such as *Clostridium* sp. and *Bacillus* sp., or genetically engineered microbes, are suitable for this step of the present invention. The naturally occurring anaerobes can be isolated from soils, and used as a mixed culture. The fermentation process generally follows two distinctive pathways: the acetate pathway and the butyrate pathway, which produce 4 and 2 moles of $H_2$ per mole of glucose, respectively. As the names imply, the acetate pathway produces ethanol and acetic acid, while the butyrate pathway produces butanol and butyric acid. Lacto-fermentation may also occur in similar environments to produce predominantly lactic acid. These pathways can be manipulated by controlling process temperature and pH, so that the optimal product distribution (i.e., tradeoffs between hydrogen and butanol), as a feedstock for the basic approach process, can be achieved.

Decarboxylation/Dehydration is step 4b according to the table above. The decarboxylation reaction is applicable for long-chain fatty acids, as well as $C_1$-$C_6$ volatile acids produced by the anaerobic fermentation. Preferably, this step is carried out in the presence of a catalyst, such as salts, oxides, hydroxides, clay minerals, and acids. Typical byproduct distributions in anaerobic fermentation broths include the following major species (with molar ratios shown in parentheses): ethanol (1), butanol (0.6), acetic acid (1.5), lactic acid (1), and butyric acid (1). Upon decarboxylation, the following alkenes can be obtained: ethylene (1) from lactic acid, and propylene (1) from butyric acid, respectively. Decarboxylation of acetic acid may form methane or C1 derivatives. Alcohols can be effectively dehydrated in high-temperature water to form corresponding alkenes. Specifically, the following alkenes can be obtained: ethylene (1) from ethanol and butene (0.6) from butanol, respectively.

Another important function of this processing step is to recycle and reuse glycerol derived from soybean oil hydrolysis under the CH process conditions. Glycerol remains in the aqueous phase of the CH effluent. Upon dehydration, glycerol can be converted into acrolein, allyl alcohol, or other products, which combine with other alkenes to form an average $C_3$ olefin mixture as the feedstock for the cyclization step.

The CH product may be fractionated before hydrogenation. This will permit recovery of light and heavy alkenes that can be recycled and combined with conjugated oil during Diels-Alder addition. This approach will maximize the mass conversion efficiency. The biofuel fraction may be hydrotreated as in the general process of the present invention.

Biofuel converted from triglycerides is a pure hydrocarbon that contains no sulfur, oxygen, or nitrogen or reactive olefins. It is highly paraffinic, isoparaffinic, naphthenic, and low aromatic. This fuel is similar to Fisher-Tropsch fuels with the addition of naphthenes. These chemical properties suggest a biofuel that has well above average thermal stability and low temperature properties, and high gravimetric energy content.

The invention claimed is:

1. A process of converting unsaturated triglycerides to biofuels comprising the steps of:
   a. preconditioning the unsaturated triglycerides to form a modified triglyceride mixture, the triglycerides therein having their carbon backbone structurally altered by means of (i) isomerization by catalytic conjugation resulting in conjugated triglycerides; (ii) cyclization by combining said conjugated triglycerides with an alkene by means of Diels-Alder reaction, resulting in conjugated triglycerides and cyclized triglycerides; and (iii) cross-linking the fatty acid carbon backbones of said conjugated and cyclized triglycerides;
   b. contacting said modified triglyceride mixture with a water mixture comprising a catalyst, said water mixture having a temperature sufficient to bring the modified triglyceride and water mixture to a temperature of at least 240° C., causing the modified triglycerides to undergo catalytic hydrothermolysis to produce a crude hydrocarbon oil; and
   c. post refining said crude hydrocarbon oil to produce various grades of biofuels.

2. The process of claim 1, wherein said alkene is a hydrocarbon comprising at least one double bond having a molecular formula of Y(H)C=C(H)X, where X and Y are each selected from the group comprising: hydrocarbon and hydrogen.

3. The process of claim 1, wherein said post refining step comprises hydrotreating said crude hydrocarbon oil using hydrogen.

4. The process of claim 3, wherein said alkene and said hydrogen are derived from fermentable feedstocks of the source of the vegetable oil, said process further comprising the steps of:
   anaerobically fermenting feedstocks to produce the products of hydrogen gas, and an aqueous solution of a volatile acid and an alcohol;
   converting said volatile acid and alcohol to an alkene in the aqueous solution by means of decarboxylation and dehydration;
   feeding said alkene to said cyclization process; and
   feeding said hydrogen to said post refining step.

5. The process of claim 4, wherein said volatile acid comprises molecules having three or more carbon atoms.

6. The process of claim 4, wherein said step of converting the volatile acid and alcohol to an alkene is carried out at a temperature of from 300° C. to about 500° C., and at a pressure from about 50 bar to about 300 bar.

7. The process of claim 4, wherein said step of converting the volatile acid and alcohol to an alkene is carried out in the presence of at least one second catalyst, said second catalyst being selected from the catalysts within the general categories of compounds consisting of: salts, oxides, hydroxides, clays, minerals, acids, and combinations thereof.

8. The process of claim 4, wherein said volatile acid is selected from the group consisting of: lactic acid, propionic acid, malonic acid, butyric acid, and valeric acid.

9. A process of converting triglycerides to crude hydrocarbon oil, comprising the steps of:
   pre-heating the triglycerides to a temperature of between 150° C. and 300° C.; and then
   contacting said pre-heated triglycerides with high-temperature water to produce a triglyceride-water mixture, wherein the high-temperature water has a temperature sufficient to bring the triglyceride-water mixture to a temperature of between 240° C. to 500° C., thereby causing the triglycerides to undergo hydrothermolysis to produce a crude hydrocarbon oil.

10. The process of claim 9, wherein the pre-heating step further comprises
   heating the triglycerides to a temperature of between 150° C. and 180° C., and adding a catalyst to the triglycerides, to cause isomerization of the triglycerides by catalytic conjugation, resulting in conjugated triglycerides;
   heating the conjugated triglycerides to a temperature of between 170° C. to 300°, under pressure of between 5 bar and 50 bar; and
   combining an alkene with the heated conjugated triglycerides, to cause cyclization of said conjugated triglycerides by means of Diels-Alder reaction, and further to cause cross-linking of fatty acid carbon backbones of said conjugated triglycerides, thereby producing a modified triglyceride mixture for contact with the high-temperature water.

11. The process of claim 10, wherein the weight ratio of said water to said modified triglyceride mixture ranges from about 10:1 to about 1:100.

12. The process of claim 9, wherein said high temperature water comprises a catalyst.

13. The process of claim 12, wherein said catalyst is selected from catalysts within the general categories of compounds consisting of: salts, oxides, hydroxides, clays, minerals and acids.

14. The process of claim 12, wherein said catalyst is a salt having a melting point lower than the temperature of the high temperature water.

15. The process of claim 12, wherein said catalyst is selected from the group consisting of: oxides of transition metals, alkali and alkali earth metal hydroxides, mineral acids, boric acids, silicate, carbonate, molybdate, borate, bentonite and montmorillonite.

16. The process of claim 9, wherein said step of contacting the triglycerides with said high temperature water is carried out at a pressure of between about 15 bar to about 250 bar.

17. The process of claim 9, wherein the temperature of said high-temperature water causes an increase in the temperature of the triglycerides at a rate of no less than 10° C. per second.

18. The process of claim 9, further comprising the step of reducing the temperature and pressure of the crude hydrocarbon oil and water to separate the oil from the water.

19. A process of converting triglycerides into crude hydrocarbon oil, said process comprising the steps of:
(i) isomerization of the triglycerides by catalytic conjugation to form conjugated triglycerides;
(ii) cyclization of said conjugated triglycerides by combining said conjugated triglycerides with an alkene by means of Diels-Alder reaction, and cross-linking the fatty acid carbon backbones of said conjugated triglycerides; and
(iii) cracking said modified triglycerides to form crude hydrocarbon oil by applying heat and pressure to said modified triglycerides.

20. A process of converting unsaturated triglycerides to biofuels, comprising the steps of:
preconditioning unsaturated triglycerides to form a modified triglyceride mixture having their carbon backbone structurally altered, by means of (i) isomerization by catalytic conjugation resulting in conjugated triglycerides, and (ii) cross linking the fatty acid carbon backbones of said conjugated triglycerides;
contacting said modified triglyceride mixture with water of sufficient temperature to cause said modified triglycerides to undergo hydrothermolysis to produce a crude hydrocarbon oil;
fractioning said crude hydrocarbon oil to separate light, middle, heavy and residue fractions; and
post-refining said residue fractions from said crude hydrocarbon oil to produce various grades of biofuels.

21. The process of claim 20, wherein said catalyst is selected from the group consisting of: $ZnCl_2$, $Na_2CO_3$, $CU_2Cl_2$, $Cu_2Br_2$, $ZrO_2$, $TiO_2$, $Al_2O_3$, and combinations thereof.

22. The process of claim 20, further comprising the step of preheating and modifying the triglycerides before contacting them with the water, said pre-heating step further comprising
(i) heating the triglycerides to a temperature of between 150° C. and 180° C., and adding a catalyst to the triglycerides, to cause isomerization of the triglycerides by catalytic conjugation, resulting in conjugated triglycerides;
(ii) heating the conjugated triglycerides to a temperature of between 170° C. to 300° C., under pressure of between 5 bar and 50 bar; and
(iii) combining an alkene with the heated conjugated triglycerides, to cause cyclization of said conjugated triglycerides by means of Diels-Alder reaction, and further to cause cross-linking of fatty acid carbon backbones of said conjugated triglycerides.

23. A biofuel composition comprising:
a. 50-80% w/w paraffins including isoparaffins, derived from triglycerides,
b. 10-40% w/w cyclo-paraffins, derived from modified triglycerides, and
c. 0-10% w/w aromatics, derived from triglycerides, petroleum or coal;
wherein the biofuel composition has an average formula of $C_nH_{2n+m}$, wherein n ranges from 10 to 12, and m ranges from 0 to 2.

24. A process of converting triglycerides to crude hydrocarbon oil, comprising the steps of:
pre-treating the triglycerides by contacting the triglycerides with hot, compressed water to produce a triglyceride water mixture, wherein the water to triglycerides mass ratio is from about 1:100 to about 1:1,
pressurizing the triglycerides-water mixture to a pressure from about 50 to about 300 bar ,
heating the triglyceride-water mixture to a temperature of between 300° C. to 500° C., and
maintaining the triglycerides at the pressure and temperature for a period of time to cause the triglycerides to undergo hydrothermolysis.

25. The process of claim 24, wherein said water comprises a catalyst.

26. The process of claim 25, wherein said catalyst is selected from the group consisting of: halides, silicates, carbonates, molybdates, borates, and mixtures thereof.

27. The process of claim 24, wherein the weight ratio of said water to said triglycerides ranges from about 1:1 to about 1:10.

* * * * *